3 Sheets--Sheet 1.

E. D. CLAPP & F. VAN PATTEN.
Dies for Forming Carriage-Clip Blanks.

No. 148,873. Patented March 24, 1874.

Witnesses.
James Martin Jr.
H. N. Campbell

Inventors.
Emerous D. Clapp
Frederick Van Patten
by his atty
Mason Fenwick Lawrence

AM. PHOTO-LITHOGRAPHIC CO. N.Y. (OSBORNE'S PROCESS.)

E. D. CLAPP & F. VAN PATTEN.
Dies for Forming Carriage-Clip Blanks.

No. 148,873. Patented March 24, 1874.

Witnesses.
James Martin Jr.
J. N. Campbell

Inventors.
Emerson D. Clapp
Frederick Van Patten
by his atty
Mason Fenwick Lawrence 3 Sheets--Sheet 3.

E. D. CLAPP & F. VAN PATTEN.
Dies for Forming Carriage-Clip Blanks.

No. 148,873. Patented March 24, 1874.

Witnesses.
James Martin Jr.
J. N. Campbell

Inventors.
Emerous D. Clapp
Frederick Van Patten
by his attys
Mason Fenwick Lawrence

UNITED STATES PATENT OFFICE.

EMEROUS D. CLAPP AND FREDERICK VAN PATTEN, OF AUBURN, NEW YORK.

IMPROVEMENT IN DIES FOR FORMING CARRIAGE-CLIP BLANKS.

Specification forming part of Letters Patent No. 148,873, dated March 24, 1874; application filed October 7, 1873.

CASE A.

*To all whom it may concern:*

Be it known that we, EMEROUS D. CLAPP and FREDERICK VAN PATTEN, of Auburn, in the county of Cayuga and State of New York, have invented a new and useful Improvement in Dies for Forging the Blank for a Carriage-Clip and Shackle or Coupling-Iron; and we do hereby declare that the following is a full, clear, and exact description thereof, reference being had to the accompanying drawings making part of this specification, in which—

Figure 1:
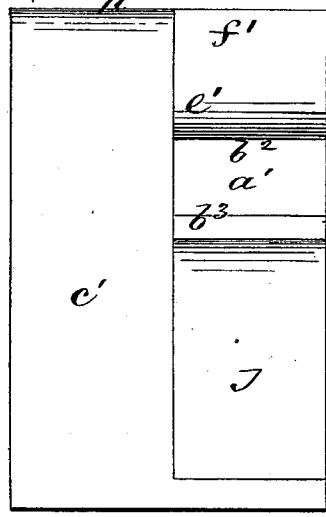
Figure 1:
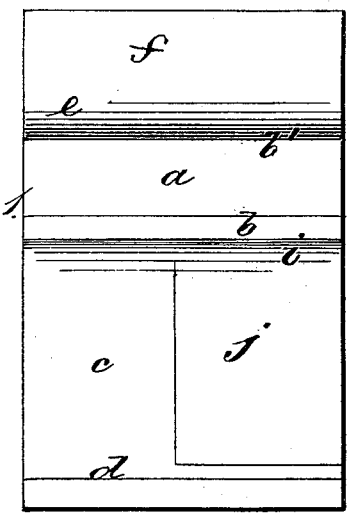
Figure 3:
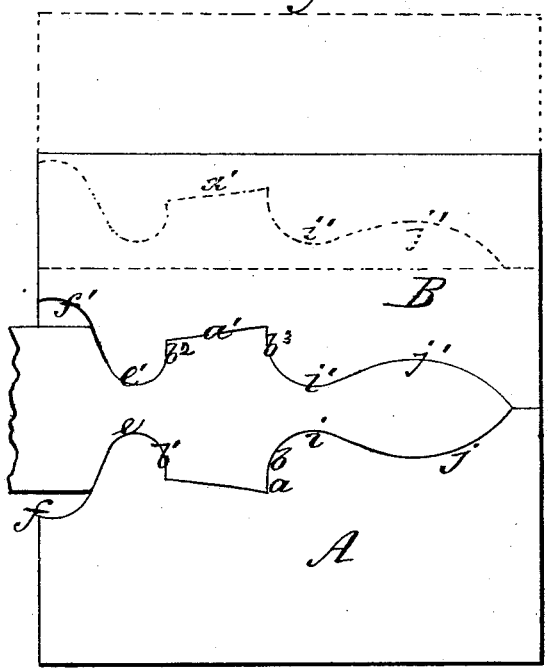
Figure 2:
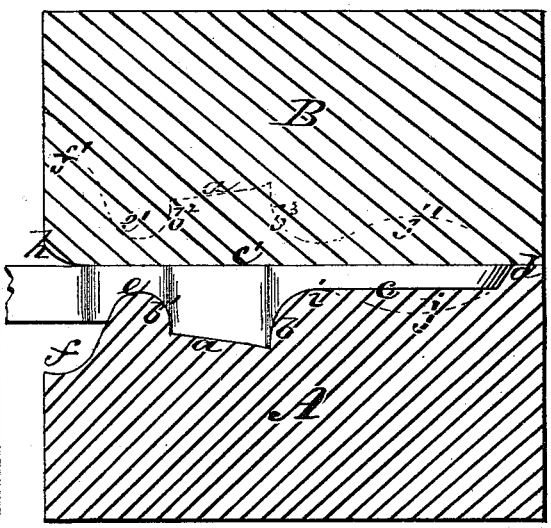
Figure 5:
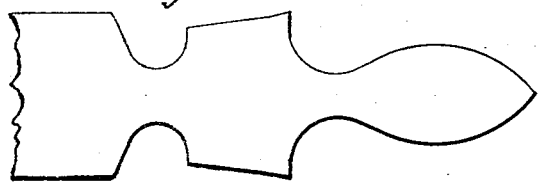
Figure 4:
Figure 6:
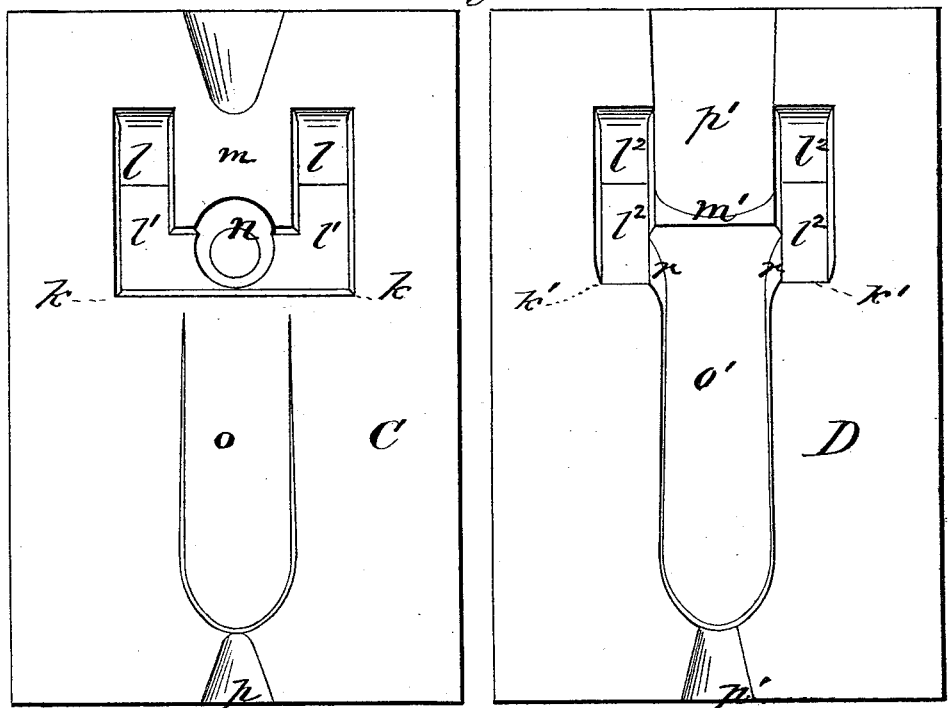
Figure 7:
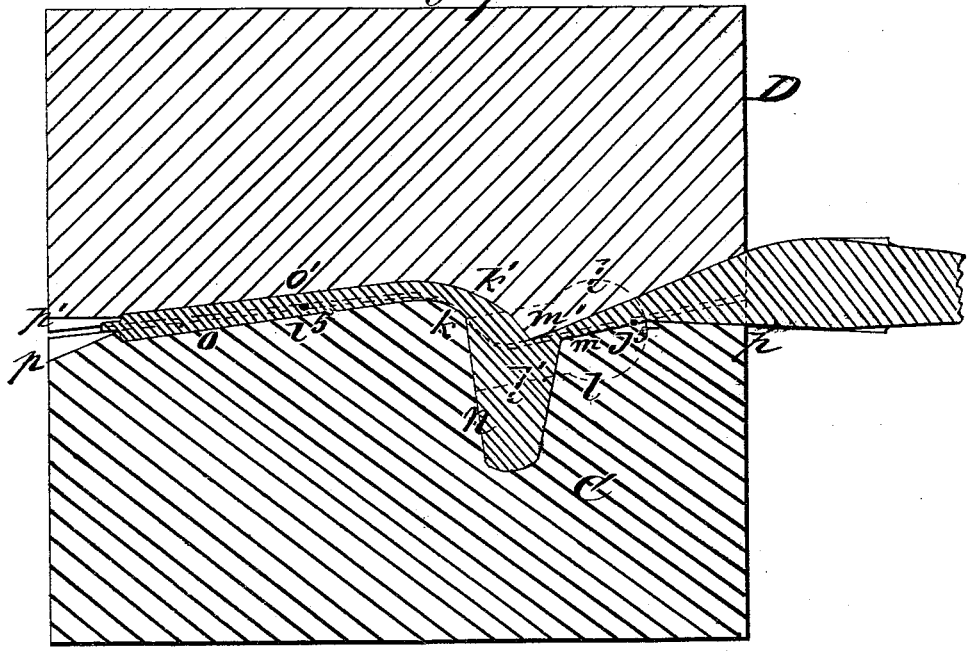
Figure 8:
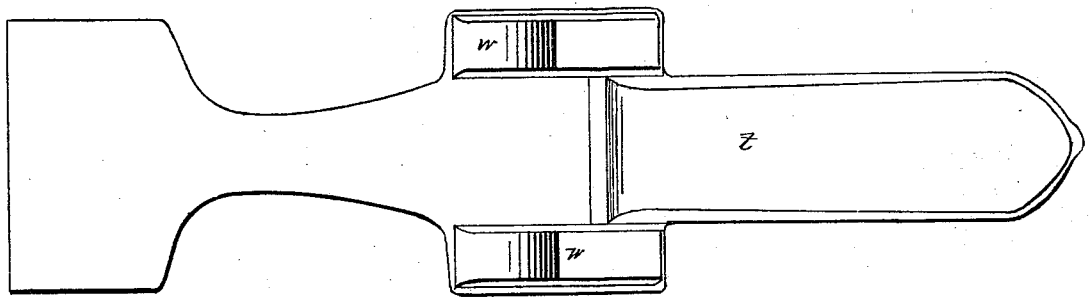
Figure 9:
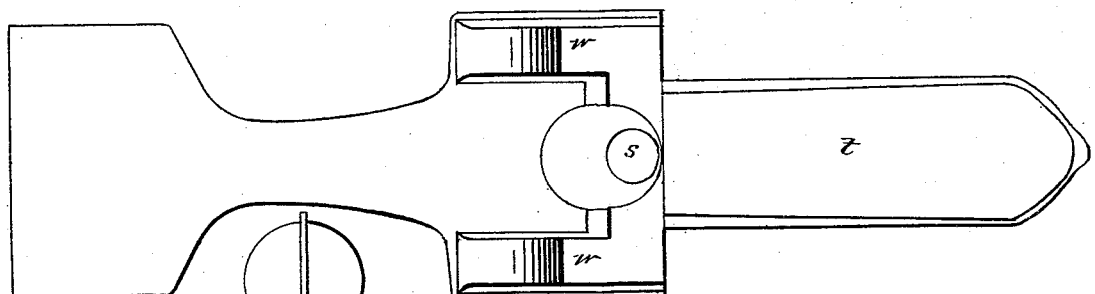
Figure 10:
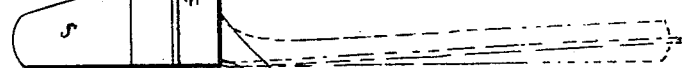
Figure 11:
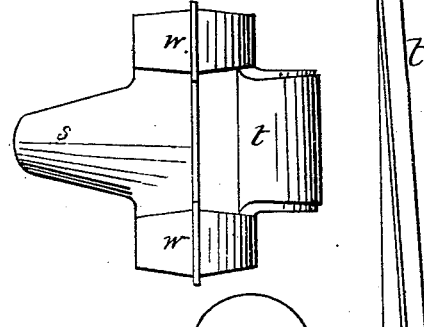
Figure 12:
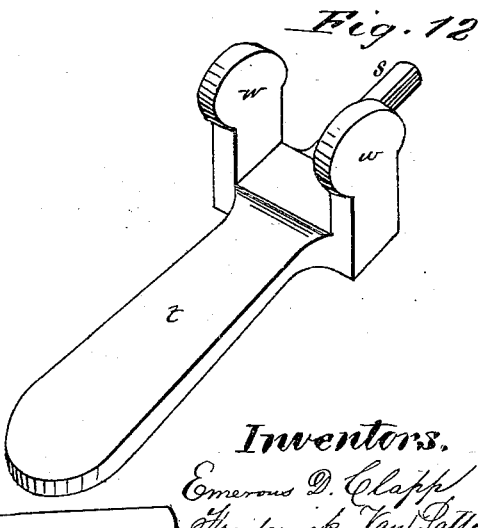
Figure 13:
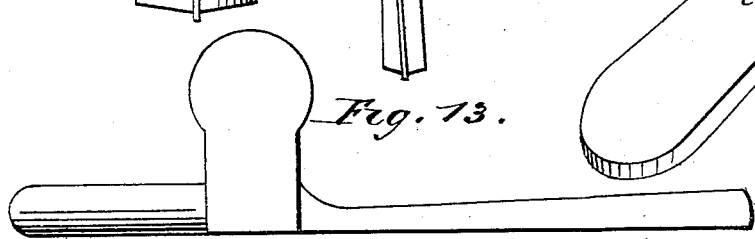

Figure 1 represents the upper and lower breaking-down die-blocks, the upper one inverted. Fig. 2 is a vertical section of the two blocks as used for producing one break-down of the bar. Fig. 3 is an edge view of the blocks as used for producing a second break-down of the bar in a direction at right angles to the first break-down. Fig. 4 shows the bar with one of the break-downs in it. Fig. 5 shows the bar with the other break-down in it as produced by Fig. 3. Fig. 6 represents, in plan, the faces of the upper and lower finishing die-blocks, the upper one being inverted. Fig. 7 is a vertical section of the two blocks as brought together upon the bar of metal shown in Figs. 4 and 5. Figs. 8 and 9 are views of the upper and lower sides of the blank as it appears removed from the finishing-die. Fig. 10 is a side view of the blank as it appears after it is severed from the bar, and has been adjusted in the position that it stands when used. Fig. 11 is a top view of the blank as in Fig. 10. Figs. 12 and 13 show the blank in perspective and side elevation after it has been further finished by mechanism which forms no part of this invention.

The nature of our invention consists, first, in the break-down dies; and, second, in the finishing-die, as will be hereinafter described, whereby at one heat a clip coupling-iron or shackle, with its jaws at right angles to the round extension therefrom, can be produced, as will be hereinafter explained.

The lower break-down die A is formed with a groove or depression, $a$, which extends entirely across its face. This depression has its base slightly inclined and its sides $b\ b^1$ curved, one of which terminates in a broad horizontal plane, $c$, which is bounded at its end by a raised inclined rib, $d$, as shown. The other side terminates in a round top rib, $e$, which has its outer side curved and its base united with a concave half-groove, $f$, the base of which is somewhat below the base of the groove $a$. The face $c'$ of the upper die-block B, which works with the part just described of the lower block, is flat and plain, except at $h$, where it is slightly curved. The die thus far described is shown clearly in Fig. 2, and it produces the form Fig. 4 on a broad narrow rectangular bar. To one side of the plane surface $c$ the lower block is shaped as at $i\ j$, and in the upper die-block B a die, $a'$, $b^2$, $b^3$, $e'$, $f'$, and $j^1\ i^1$, is formed. This change makes this part of the half-die of the upper block correspond exactly with the half-die of the lower block, as shown in Fig. 3. Between the surfaces of the die-blocks just described, the bar of metal, after leaving that part of the block shown in Fig. 2, is placed edgewise, and shaped as indicated by Figs. 3 and 5. This completes the break-down. The lower finishing die-block C is formed with two inclined planes, $i^5\ j^5$, united by a curved shoulder, $k$. Some distance within the margin of the sides and end of this block, and at the shoulder $k$, the block is cut away vertically, so as to make a die of the form shown in plan, Fig. 6, and in vertical section in Fig. 7, the dotted lines in Fig. 7 showing curved depressions $l\ l$ on each side of the frog or core portion $m$ of the die-block. Centrally, and between the core and the shoulder $k$, a deep cone-shaped depression, $n$, is cut into the block, and in the face of the die-block a long, broad, shallow depression, $o$, which begins with almost no depth at the shoulder, and gradually increases until it terminates, as shown. It will be seen that the top of the frog is in a plane with plane $j^5$ of the die-block; also, that the curved depressions $l\ l$ terminate in plane surfaces $l^1\ l^1$, which run to the vertical portion of the shoulder $k$, and form with said shoulder a right angle. It will also be observed that the frog $m$ forms a vertical continuation of the conical depression $n$. At the front and rear ends of this block a flaring inclined depression, $p\ p$, is cut, as shown. The upper die D is formed with two inclined planes, $i^5 j^5$, and a curved shoulder, K′. It also is formed with a frog or core, $m'$; but this frog connects with the base of a depression, $o'$, similar in outline to the depression $o$, but differing from it in being equal in depth from the shoulder $k$ to its terminus. The said frog $m'$ makes a sharp angle at its junction with the depression $o'$, and then is cut away, so as to form an inclined gutter-shaped recess, $p'$, to the front end of the die. On each side of the frog $m'$ there is an oblong depression, $l^2$, one-half of the base of which is concave and the other portion inclined and flat. The flat bases of these depressions terminate in the shoulder K′, and unite for a short distance with the side walls of the recesses $o'$, as indicated at $r$. A depression, $p'$, corresponding to that $p$ in the lower die, is formed in the upper die.

The operation is as follows: Take a bar of metal and place it first in the die, as shown in Fig. 2; strike it; then transfer it to the die, as shown in Fig. 3; strike it, and thus continue alternately to operate upon it in the impressions of the break-down die-blocks until the stock is distributed and caused to match the break-down impressions accurately. Next lay the bar over the impressions of the lower finishing die-block, and strike blows enough with the upper die-block to cause the stock to fill the impressions in both the upper and lower blocks. This operation will cause a fin to be formed between the jaws or eye-pieces of the shackle, and also fins on the edges of the article formed, and midway of the said eye-pieces or the jaws thereof. The article is then trimmed off by any well-known means; and we draw out the conical stem or pin $s$ to a cylindrical shape, and also bend up the portion $t$ at right angles to the jaws. The article can be finished in a milling-machine, ready for drilling and bolting up.

Heretofore many methods have been devised for forming this article which are costly and troublesome. Dies have been made to do the work; but they are very much more complicated, and quite different from ours in construction and mode of operation.

Our plan cuts off the coupling-clip blank, and does away with at least four or five different operations in producing it. We do the work with one heat of forge and with one set of finishing-dies, save stock, and make the articles uniform, with the round part $s$ at right angles with the jaws or eye-pieces $w$.

The axle-clip blank is finally shaped for use by the blacksmith drawing out the part $t$ into a clip-band long enough to pass around to the bottom of the axle, and forming a round end, with a screw-thread cut thereon, at its terminus. The smith also shapes the stem $s$, and cuts a thread upon its terminus, and the plate, as usual, is confined by nuts upon the screw-threaded ends.

What we claim as our invention, and desire to secure by Letters Patent, is—

1. The break-down die-blocks A B, with the die in them for shaping the bar as shown in Fig. 2, substantially as set forth.

2. The break-down die-blocks A B, with the die in them for shaping the bar as shown in Fig. 3, substantially as described.

3. The finishing die-blocks C D, with the die therein for producing the clip carriage coupling-iron, substantially as described.

EMEROUS D. CLAPP.
FREDERICK VAN PATTEN.

Witnesses:
HORACE T. COOK,
GEO. D. RUSSELL.